US012216522B2

(12) United States Patent
Srinivasan et al.

(10) Patent No.: US 12,216,522 B2
(45) Date of Patent: Feb. 4, 2025

(54) METHODS AND SYSTEMS FOR EXPANDING GPU MEMORY FOOTPRINT BASED ON HYBRID-MEMORY

(71) Applicants: Venkatachary Srinivasan, Sunnyvale, CA (US); David Michael Finnegan, Warwick, NY (US)

(72) Inventors: Venkatachary Srinivasan, Sunnyvale, CA (US); David Michael Finnegan, Warwick, NY (US)

( * ) Notice: Subject to any disclaimer, the term of this patent is extended or adjusted under 35 U.S.C. 154(b) by 66 days.

(21) Appl. No.: 17/898,451

(22) Filed: Aug. 29, 2022

(65) Prior Publication Data

US 2023/0113180 A1  Apr. 13, 2023

Related U.S. Application Data

(63) Continuation of application No. 17/563,017, filed on Dec. 27, 2021, now abandoned, which is a continuation-in-part of application No. 17/317,878, filed on May 11, 2021, now abandoned.

(60) Provisional application No. 63/105,357, filed on Oct. 26, 2020, provisional application No. 63/022,584, filed on May 11, 2020.

(51) Int. Cl.
  *G06F 16/27* (2019.01)
  *G06F 9/50* (2006.01)
  *G06F 11/07* (2006.01)

(52) U.S. Cl.
  CPC .......... *G06F 11/0709* (2013.01); *G06F 9/505* (2013.01); *G06F 16/27* (2019.01)

(58) Field of Classification Search
  USPC ........................................................ 707/802
  See application file for complete search history.

(56) References Cited

U.S. PATENT DOCUMENTS

| | | | | |
|---|---|---|---|---|
| 2008/0276067 | A1* | 11/2008 | Chen ................... | G06F 12/1027 |
| | | | | 711/206 |
| 2018/0004777 | A1* | 1/2018 | Bulkowski .......... | G06F 16/2255 |
| 2019/0312772 | A1* | 10/2019 | Zhao .................... | G06F 9/5011 |

(Continued)

OTHER PUBLICATIONS

Chao Li; Locality-Driven Dynamic GPU Cache Bypassing; 2015; ACM; pp. 67-77 (Year: 2015).*

(Continued)

*Primary Examiner* — Albert M Phillips, III
*Assistant Examiner* — Jermaine A Mincey

(57) ABSTRACT

In one aspect, a computerized method for expanding a graphics processing unit (GPU) memory footprint based on a hybrid-memory of a distributed database system (DDBS) includes the step of providing the DDBS. The DDBS is modified to include a plurality of GPUs; providing a local memory of a GPU of the plurality of GPUs. The method includes the step of filling the local memory of the GPU with one or more digests from the DDBS. The method includes the step of running a distributed general-purpose cluster-computing framework instance on the local memory of the GPU. The method includes the step of fetching data from the local memory of the GPU using the distributed general-purpose cluster-computing framework instance. The method includes the step of storing a result of the fetch operation in the DDBS to extend the local memory of the GPU to handle more data than what is fitted into the local memory of the GPU.

10 Claims, 4 Drawing Sheets

(56) References Cited

U.S. PATENT DOCUMENTS

| | | | |
|---|---|---|---|
| 2020/0265068 A1* | 8/2020 | Zhang | G06F 16/275 |
| 2021/0081849 A1* | 3/2021 | Mezaael | H04W 4/40 |
| 2021/0097432 A1* | 4/2021 | Olgiati | G06F 17/18 |
| 2022/0188965 A1* | 6/2022 | Li | G06T 1/20 |

OTHER PUBLICATIONS

Jan Vesely; Observations and Opportunities in Architecting Shared Virtual Memory for Heterogeneous Systems; IEEE; pp. 161-171 (Year: 2016).*

* cited by examiner

METHODS AND SYSTEMS FOR EXPANDING GPU MEMORY FOOTPRINT BASED ON HYBRID-MEMORY

CLAIM OF PRIORITY

This application hereby incorporates by reference U.S. Provisional Patent Application No. 63/105,357, filed on 26 Oct. 2020 and titled METHODS AND SYSTEMS FOR EXPANDING GPU MEMORY FOOTPRINT BASED ON HYBRID-MEMORY.

This application hereby incorporates by reference U.S. Provisional Patent Application No. 63/022,584, filed on May 11, 2020 and titled METHODS AND SYSTEMS FOR UNIFORM BALANCING OF REPLICAS ACROSS A CLUSTER OF NODES IN A DISTRIBUTED, SCALABLE DATABASE.

BACKGROUND

It is noted that graphical processes units (GPUs) are currently limited in terms of scale as there is a limited about of data that can be fit in the GPU memory. It is further noted that database system can use a hybrid memory architecture that provides the ability to have real-time access to data that is much larger than the size of memory (e.g. by leverage flash systems). Accordingly, improvements that enable a hybrid memory architecture of the database system that can be extended to a GPU system are desired.

SUMMARY OF THE INVENTION

In one aspect, a computerized method for expanding a graphics processing unit (GPU) memory footprint based on a hybrid-memory of a distributed database system (DDBS) includes the step of providing the DDBS. The DDBS is modified to include a plurality of GPUs; providing a local memory of a GPU of the plurality of GPUs. The method includes the step of filling the local memory of the GPU with one or more digests from the DDBS. The method includes the step of running a distributed general-purpose cluster-computing framework instance on the local memory of the GPU. The method includes the step of fetching data from the local memory of the GPU using the distributed general-purpose cluster-computing framework instance. The method includes the step of storing a result of the fetch operation in the DDBS to extend the local memory of the GPU to handle more data than what is fitted into the local memory of the GPU.

Figure 1:
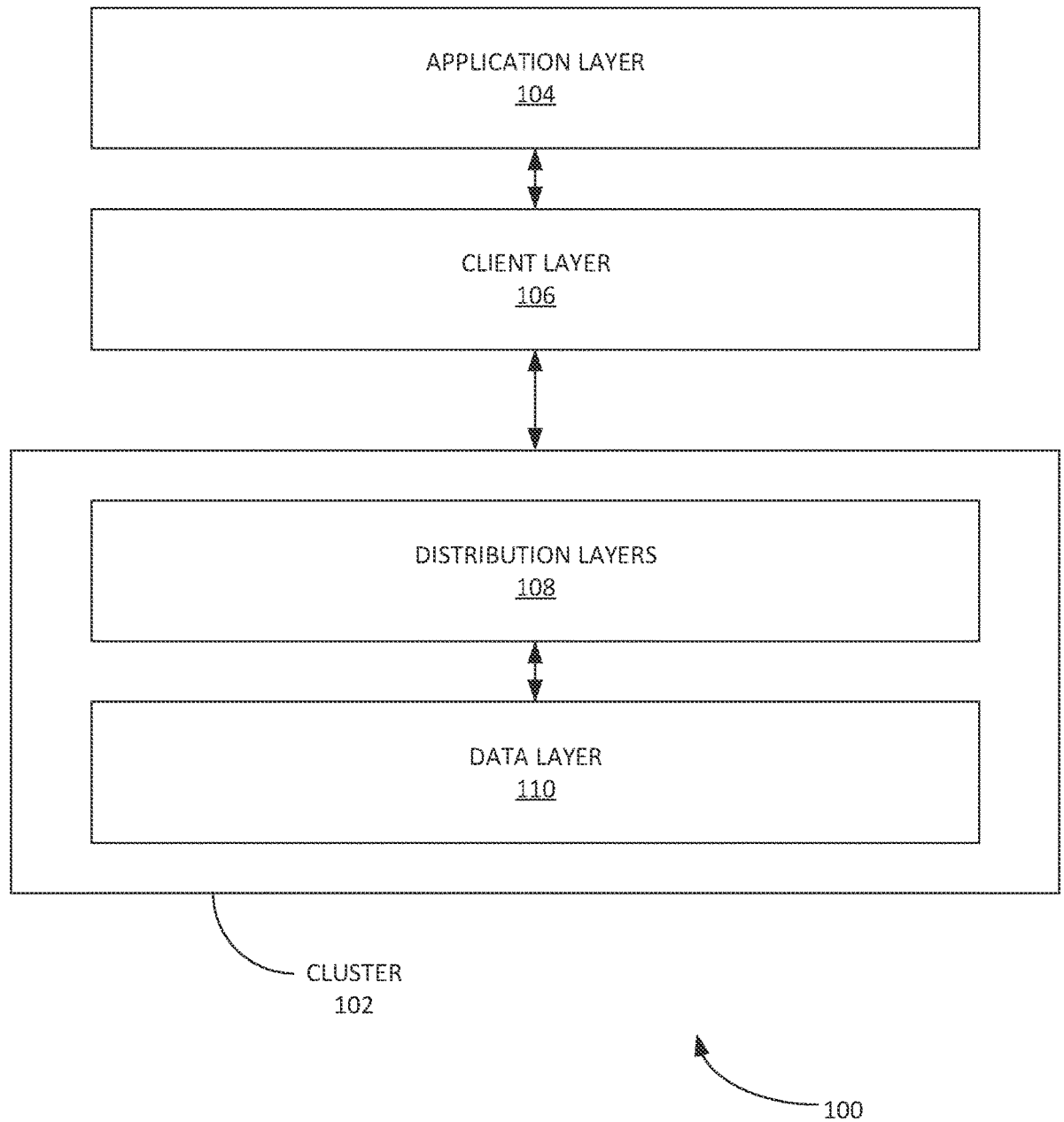
FIG. 1 shows, in a block diagram format, a distributed database system (DDBS) operating in a computer network according to an example embodiment.

The Figures described above are a representative set and are not exhaustive with respect to embodying the invention.

DESCRIPTION

Disclosed are a system, method, and article of manufacture for expanding GPU memory footprint based on hybrid-memory. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Apache Spark is an open-source distributed general-purpose cluster-computing framework. Spark provides an interface for programming entire clusters with implicit data parallelism and fault tolerance.

Dynamic random-access memory (DRAM) can be a type of random-access memory that stores each bit of data in a separate capacitor within an integrated circuit.

Flash memory is an electronic non-volatile computer memory storage medium that can be electrically erased and reprogrammed. The two main types of flash memory, NOR flash and NAND flash, are named for the NOR and NAND logic gates. NOR and NAND flash use the same cell design, consisting of floating gate MOSFETs. They can differ at the circuit level depending on whether the state of the bit line or word lines is pulled high or low. In NAND flash, the relationship between the bit line and the word lines resembles a NAND gate; in NOR flash, it resembles a NOR gate. Flash memory can be a type of floating-gate memory.

Graphics processing unit (GPU) is a specialized, electronic circuit designed to rapidly manipulate and alter memory to accelerate the creation of images in a frame buffer intended for output to a display device.

RIPEMD-160 hash can be a cryptographic hash function implemented as a 160-bit RIPEMD hash. A RIPEMD-160 hash can typically be represented as 40-digit hexadecimal numbers.

Solid-state drive (SSD) can be a data storage device using integrated circuit assemblies as memory to store data persistently.

Exemplary Computer Architecture and Systems

FIG. 1 shows, in a block diagram format, a distributed database system (DDBS) 100 operating in a computer network according to an example embodiment. DDBS 100 can be a distributed, scalable database. The architecture of DDBS 100 can have various objectives, inter alia: create a flexible, scalable platform for web-scale applications; provide the robustness and reliability (e.g. as in ACID) expected from traditional databases; provide operational efficiency with minimal manual involvement; etc.

An example DDBS 100 architecture is now discussed. DDBS 100 architecture can comprise three layers. Client Layer 106 is a cluster-aware layer and includes, inter alia: open-source client libraries. These can implement APIs, track nodes, and/or know where data resides in the cluster.

Clustering and Data Distribution Layer 108 can manage cluster communications and automates fail-over, replication, cross data center synchronization, intelligent re-balancing and/or data migration. Data Storage Layer (e.g. Data Layer 110) reliably stores data in DRAM and/or Flash systems for fast retrieval.

Client Layer 102 can be a smart client designed for speed, Client Layer 102 can be implemented as an open-source linkable library available in, inter alia: C, C#, Java, Node.js and the like. Developers can contribute new clients and/or modify existing clients. Client Layer 102 implements example API(s), a client-server protocol, and/or communicates directly to a duster. Client Layer 102 tracks nodes and knows where data is stored. Client Layer 102 can instantly (e.g. assuming networking and processing latencies and the like) learn of changes to duster configuration or when nodes go up or down. Client Layer 102 can implement its own TCP/IP connection pool for efficiency. Client Layer 102 can also detect transaction failures that have not risen to the level of node failures in the duster and re-routes those transactions to nodes with copies of the data. Client Layer 102 transparently sends requests directly to the node with the data and re-tries or re-routes requests as needed (e.g. during duster re-configurations).

DDBS 100 architecture reduces transaction latency, offloads work from the duster, and eliminates work for the developer. DDBS 100 ensures that applications do not have to restart when nodes are brought up or down.

Distribution Layer 108 is now discussed. It is noted that DDBS 100 can have a shared-nothing architecture that is designed to reliably store terabytes of data with automatic fail-over, replication, and cross data-center synchronization. Distribution Layer 108 can scale linearly. Distribution Layer 108 can be configured to eliminate manual operations with the systematic automation of all cluster management functions. Distribution Layer 108 can include the following modules. Cluster Management Module (not shown) can track nodes in the cluster. The algorithm can be a Paxos-based gossip-voting process that determines which nodes are considered part of the cluster. Distribution Layer 108 can implement a special heartbeat (e.g. both active and passive) to monitor inter-node connectivity.

In some examples, the shared-nothing architecture can include the following conditions. Every node in the cluster is identical. All nodes are peers. There is no single point of failure. Additionally, a smart partitions algorithm can be used to distribute data evenly across all nodes in the cluster.

In some examples, a data-rebalancing mechanism can be used to ensure that query volume distributes evenly across the cluster nodes, and is persistent during node failure. Rebalancing may not impact cluster behavior. For example, transaction algorithms can be implemented by Distribution Layer 108 to ensure that there is one consensus vote to coordinate a cluster change. Voting per cluster change, instead of per transaction, can provide higher performance while maintaining shared-nothing simplicity.

Distribution Layer 108 can provide configuration options to specify how fast a rebalance operation proceeds. For example, temporarily slowing transactions may heal a cluster more quickly. If there is a need to maintain transactional speed and volume, the cluster can rebalance more slowly. During rebalance, Distribution Layer 108 may not retain full replication factors of all partitions.

A Data Migration Module (not shown) can be used to add or remove nodes, Database cluster membership can be ascertained by the Data Migration Module. Each node can use a distributed hash algorithm to divide the primary index space into data slices and assign owners. Data Migration Module can intelligently balance data distribution across all nodes in the duster. This can ensure that each bit of data replicates across all duster nodes and datacenters. This operation can be specified in the system replication factor configuration.

Division can be algorithmic. DDBS 100 can scale without a master. This can eliminate the need for additional configuration as required in a sharded environment.

The Transaction Processing Module (not shown) can read and write data on request, and provide various consistency and isolation guarantees. Transaction Processing Module can manage synchronization/asynchronization replication. For writes with immediate consistency, Transaction Processing Module can propagate changes to replicas before committing the data and returning the result to the client.

Transaction Processing Module can use a proxy. For example, during cluster re-configurations when the Client Layer 106 may be briefly out of date, the Transaction Processing Module can transparently proxy the request to another node.

Transaction Processing Module can use duplicate resolution. For clusters recovering from being partitioned, Transaction Processing Module can resolve any conflicts between different copies of data. Resolution can be configurable to be based on the generation (e.g. version) or expiration timestamp.

Transaction Processing Module can implement clustering operations. For example, once the first is cluster up, additional clusters can be installed in other datacenters and setup cross-datacenter replication to ensure that if a datacenter goes down, the remote cluster takes over the workload with minimal or no interruption to users.

Data Storage Layer 110 can use a key-value store with a schemaless data model. Data flows into policy containers, namespaces, which are semantically similar to databases in an RDBMS system. Within a namespace, data is subdivided into sets (e.g. RDBMS tables) and records (e.g. RDBMS rows). Each record has an indexed key unique in the set, and one or more named bins (e.g. RDBMS columns) that hold values associated with the record. It is noted that sets and bins may not need to be defined. For flexibility; they can be added at run-time. Values in bins can be strongly typed, and can include any supported data-type. Bins are not typed, so different records can have the same bin with values of different types.

Indexes, including the primary index and optional secondary indexes, can be stored by default in DRAM for fast access. The primary index can also be configured to be stored in persistent memory or on an NVMe flash device. Values can be stored either in DRAM or on SSDs. Each namespace can be configured separately, so small namespaces can utilize DRAM and larger ones can gain the cost benefits of SSDs. Data storage Layer 110 can be designed for speed and to provide a dramatic reduction in hardware costs. Data storage Layer 110 can operate all in-memory, which may eliminate the need for a caching layer or it can take advantage of unique optimizations for flash storage. In one example, one hundred million keys can take up 6.4 GB. Although keys may have no size limitations, each key can be efficiently stored in just 64 bytes. Native, multi-threaded, multi-core Flash I/O and a log structured file system can utilize low-level SSD read and write patterns. To minimize latency, writes to disk can be performed in large blocks. This mechanism can bypass the standard file system, historically tuned to rotational disks.

A smart defragmenter and intelligent evictor can work together to ensure that there is space in DRAM and that data is never lost and is always safely written to disk. The smart defragmenter can track the number of active records in each block and reclaims blocks that fall below a minimum level of use. An intelligent evictor can remove expired records and reclaims memory if the system gets beyond a set high-water mark. Expiration times are configured per namespace. Record age can be calculated from the last modification. The application can override the default lifetime and specify that a record should never be evicted. Application layer 104 software is provided by users or third parties. Cluster(s) include the distributed layer 108 and data storage layer 110.

DDBS 100 can provide a rack awareness feature. Rack awareness can allow a user to store different replicas of records (e.g. from non-master partitions) on different hardware failure groups. For example, if a replication-factor is 2, the master copy of a partition and its replica can be stored on different hardware failure groups. These groups can be defined by their respective rack-id.

A rack-aware configuration can affect the proles partitions and may not have an effect on master partitions distribution in the cluster. By default, replica partitions can be evenly distributed across all cluster nodes. Each node (e.g. of a cluster containing n nodes) may approximately own 1/nth of the data partitions as master. The replicas for these partitions can be evenly distributed between the other n−1 nodes (e.g. in total, each node owns approximately rf/n—where rf is the replication-factor). When a physical rack fails (and/or availability zone in case of a cloud-platform deployment) those nodes can contain both master and replica partitions for the same partition, resulting in possible data unavailability. To avoid such data unavailability, the rack-aware feature can be configured to use multiple racks (e.g. defined by rack-id). When the replication-factor is less than or equal to the number of racks, replication factor number of racks are ensured to have a copy of the partition, for each partition. If the replication factor is greater than the number of racks, all racks can have a copy of the partition's data, and some racks can have additional copies of partitions, for each partition. If a single node goes down, the cluster is temporarily unbalanced until the node is restored. This imbalance may not cause service interruptions. The cluster can continue uninterrupted.

Figure 2:
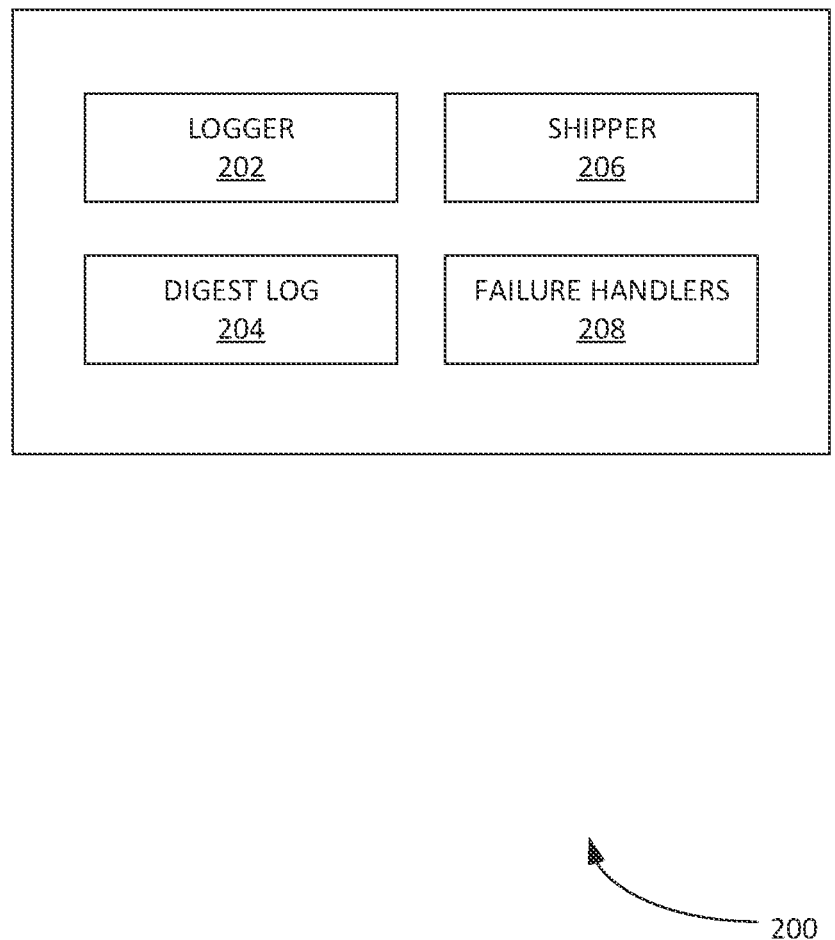
FIG. 2 illustrates an example system for Cross Datacenter Replication (XDR), according to some embodiments.

FIG. 2 illustrates an example system for Cross Datacenter Replication (XDR) 200, according to some embodiments. XDR 200 is designed to synchronize clusters over higher-latency links (e.g. WAN links, etc.). XDR 200 can be asynchronous with a replication lag usually below one second. Each client write can be logged on the written-to cluster (e.g. the local cluster), and this log can be used to replicate modified data from the local cluster to one or more remote clusters. Replication can be selective as well. Different namespaces and/or sets can be replicated to different remote clusters. XDR 200 can offer the same redundancy as a single cluster. The master node for any partition is responsible for replicating writes for that partition. When the master fails and a replica is promoted to master, the new master can take over where the failed master left off.

In addition to duster node failures, XDR 200 can handle failures of a network link and/or of a remote duster. First, replication via the failed network link and/or to the failed remote duster is suspended. Then, once the issue has been resolved and operations have returned normal, XDR 200 can resume for the previously unavailable remote cluster and catch up. Replication via other (e.g. intact) links to other (e.g. intact) remote dusters can remain unaffected at all times.

When XDR 200 logs a client write, it logs the key digest of the written record (e.g. it does not log the record content). Accordingly, the log file is referred to as the digest log. To replicate client writes, XDR 200 reads key digests from the digest log, retrieves the corresponding records from storage, and writes the retrieved records to the remote cluster(s). In case of hot records, (e.g. records that change very frequently) optional deduplication coalesces multiple local writes to the same record into a single remote write.

Logger 202 can log local writes to the digest log on the local cluster. Shipper 206 can replicate writes for partitions for which a node is the master. Node Failure Handler 208 can take over another master's replication obligation, should that master fail. Link Failure Handler makes a remote cluster catch up once XDR 200 for that cluster resumes after a network link or remote cluster failure.

Logger 202 is now discussed. Logger 202 can store only minimal information about each client write—the key digest of the written-to record—in the digest log file. This keeps the size of the digest log file manageable. The digest log can be a ring buffer file. The most-recent data overwrites the oldest data (e.g. if the buffer is full). This caps the file size. A digest log file of sufficient size can be configured to avoid losing any data waiting to ship. The digest log file size on each cluster node can be configured such that it is able to retain the key digests of all writes to that node (e.g. master, as well, as replica) even in case of multi-day outages.

The size of the digest log file can be changed without deleting the contents of the old file. If the digest log file size configuration is changed, the existing digest log file can be deleted before starting XDR 200.

Shipper 206 is now discussed. Shipper 206 reads the digest log and ships the modified records. To the remote cluster, Shipper 206 looks like any other client application; the data ships to the remote cluster in a normal write operation.

The XDR ship throughput to a remote site can be predominantly dependent on the client write throughput on the local cluster, and the available bandwidth between the local and remote datacenters. If the client write throughput is consistently above the XDR ship throughput, XDR cannot synchronize all data on the remote cluster. Modified records awaiting shipment to the remote cluster back up and may be dropped. In one example, production environments have load cycles with peak times.

Failure Handlers 208 are now discussed. Failure Handlers 208 can ensure that the system ships data in case of the following failures: local cluster node failure (e.g. node failure handler, etc.); communications failure (e.g. link to remote down); link failure handler; etc.

XDR can ensure that data is not lost during single-node failures. Data can be lost only in extreme situations such as digest log overflow or if a master and replica fail simultaneously. On failure of a master node, promoted replica nodes start to ship their copies of the failed master's data.

An example XDR workflow implemented by XDR system 200 is now discussed. At startup, the local cluster discovers namespaces that can be synchronized with the remote cluster. It is noted that the number of remote cluster nodes can differ from the source cluster. Client reads are served by local nodes (e.g. using local replication). Each client write is stored in the digest log on the master node, as well as, the digest logs on the replica nodes for the write. In this way, the digest log is subject to the same degree of redundancy on the local cluster as is the written data. When a master node fails, replicas can take over. Writes are confirmed when the master and replica have successfully written the data.

XDR 200 can asynchronously ship the client writes in the digest log to the remote datacenter to synchronize the remote duster with the local cluster. XDR 200 reads a key digest from the digest log. XDR 200 reads the corresponding record from storage. XDR 200 writes the record to the remote cluster. In case the record cannot be written to the remote cluster, its key digest is re-logged to the digest log. In this way, the record can be processed again at a future point in time.

There may be no one-to-one correspondence between nodes of the local cluster and nodes of the remote cluster. Even if both have the same number of nodes, partitions may be distributed differently across nodes in the remote cluster than they are in the local cluster. Hence, every master node of the local cluster may write to any remote cluster node. Like any other client, XDR 200 writes a record to the remote master node for that record.

Example XDR topologies are now discussed. XDR configurable topologies can be, inter alia: simple active-passive; simple active-active; star replication; combination topology; etc.

Failure Handling is now discussed. XDR 200 can manage the following failures, inter alia: local node failure; remote link failure; combinations of thereof, etc. XDR 200 can manage local node failure. In case of a local node failure, the node failure handlers on the replica nodes can assume control of the shipping responsibilities of Shipper 206 on the failed master node. The replicas have a copy of the master's records, as well as, a copy of the relevant portions of the master's digest log file, which allows them to pick up where the failed master left off. XDR 200 can manage communications failure. If the connection between the local and the remote cluster drops, the link failure handler on each master node records the point in time when the link went down and shipping is suspended for the affected remote datacenter. When the link becomes available again, shipping resumes in two ways: new client writes are shipped by Shipper(s) 206, just as they were before the link failure; client writes that happened during the link failure (e.g. client writes that were held back while shipping was suspended for the affected remote cluster, are shipped by the Link Failure Handlers); etc. The Link Failure Handlers are responsible to make the affected remote duster catch up and receive the client writes that happened during the failure.

When XDR 200 is configured with star topology, a duster can simultaneously ship to multiple datacenters. If one or more datacenter link drops, XDR 200 continues to ship to the remaining available datacenters. XDR 200 can also handle more complex scenarios, such as local node failures combined with remote link failures. XDR 200 can manage combination failure. XDR 200 also manages combination failures such as local node down with a remote link failure, link failure when XDR is shipping historical data, and so on.

XDR 200 can manage compression. XDR 200 can compress shipment data to save bandwidth between datacenters. XDR 200 can enable configuration XDR-compression-threshold, so that only records larger than this minimum size are compressed. XDR 200 can manage per-namespace shipping. For example, nodes can have multiple namespaces. Different namespaces can be configured to ship to different remote clusters. In this illustration, DC1 is shipping namespaces NS1 and NS2 to DC2, and shipping namespace NS3 to DC3. XDR 200 can use this flexibility to set different replication rules for different data sets. In the current example, writes to namespace NS1 can loop around the clusters forming a ring. To avoid this, XDR 200 can enable use of the XDR option that stops forwarding writes coming from another XDR.

XDR 200 can manage sets. For fine-grained control over which data to ship, XDR 200 can be configured to ship certain sets (e.g. RDBMS tables) to a datacenter. The combination of namespace and set determines whether to ship a record, XDR 200 can enable use sets if not all of the data in a namespace in a local cluster needs to be replicated in other clusters.

XDR 200 can manage heterogeneous cluster synchronization. XDR 200 works for clusters of different size, operating system, storage media, and so on. The XDR failure handling capability allows the source cluster to change size dynamically. It also works when multiple-destination datacenters go up and down often.

XDR 200 can manage a remote duster in a local datacenter. While the most common deployment has local and remote dusters in different datacenters, sometimes the remote duster may be in the same datacenter. Example reasons for this include, inter alia, following. The remote duster can be for data analysis. XDR 200 can configure the remote cluster for passive mode and run all analysis jobs in that cluster. This isolates the local cluster from the workload and ensures availability.

Multiple availability zone datacenters can be used to ensure that if there is a large-scale problem with one availability zone, the other is up. Administrators that have had problems with availability zone outages may elect to have clusters in multiple availability zones within a datacenter. All nodes in a cluster can belong to the same availability zone.

XDR 200 can manage shipping deletes. XDR 200 ships deletes, as well as, writes. Delete shipping can be used to synchronize objects with all datacenters. Client-initiated deletes may ship by default. XDR 200 can enable a configuration of whether or not to ship deletes generated via eviction of objects.

Figure 3:
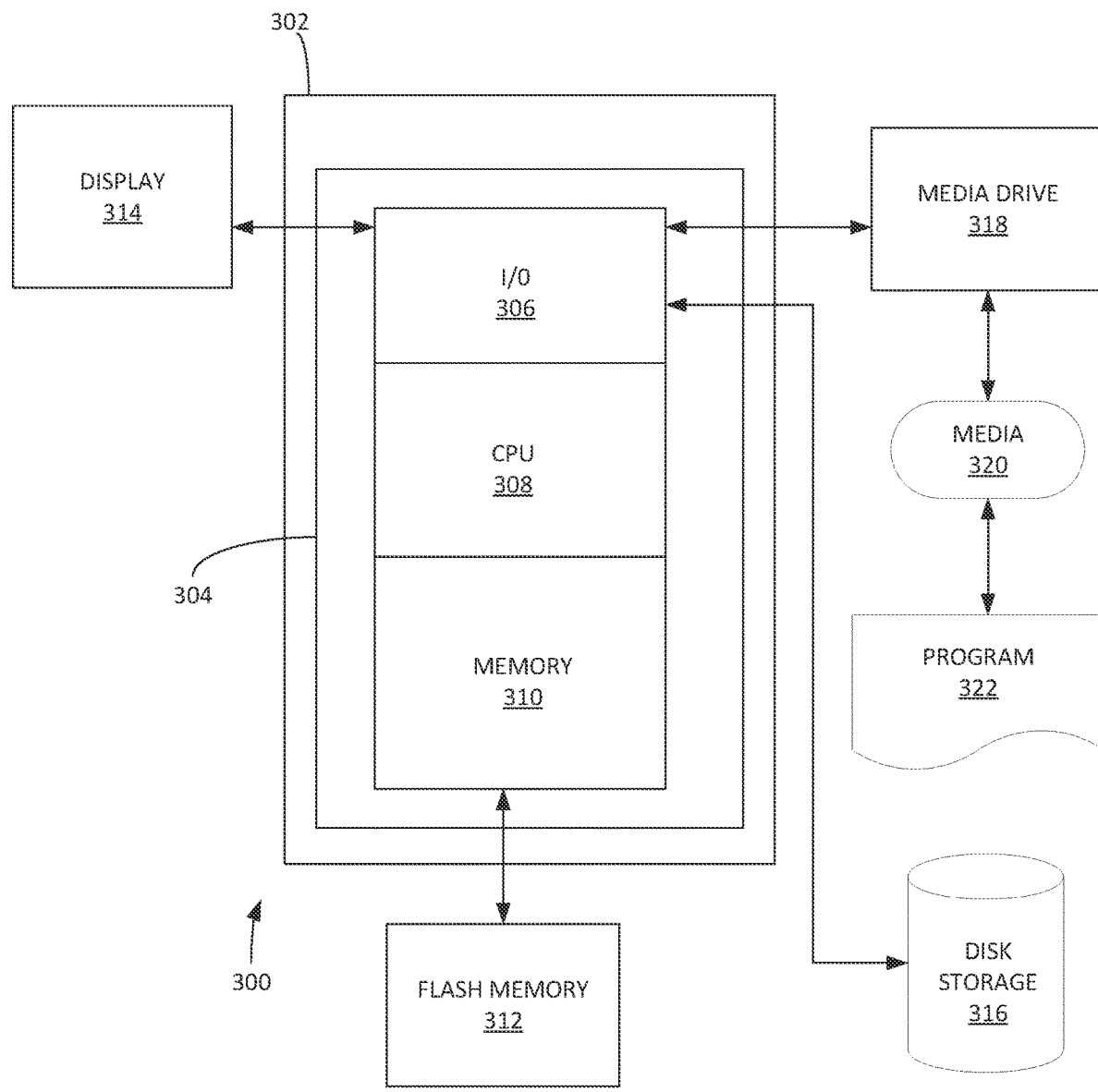
FIG. 3 depicts an exemplary computing system that can be configured to perform any one of the processes provided herein.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Computing system 300 can include a web browser. Moreover, it is noted that computing system 300 can be configured to include additional systems in order to fulfill various functionalities. Computing system 300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Expanding GPU Memory Footprint Based on Hybrid-Memory

It is noted that GPUs are currently limited in terms of scale as there is a limited about of data that can be fit in the GPU memory. It is noted that DDBS 100 can use a hybrid memory architecture that provides the ability to have real-time access to data that is much larger than the size of memory (e.g. by leveraging one or more flash memory systems).

The hybrid memory architecture of DDBS 100 can be extended to a GPU system. It is noted that GPU's typically have processes that repeatedly access at a lot of data and take subsets of said data (e.g. using divide and conquer algorithms). This can lead to a two-faced process. In a two-faced process, data can be distributed in parallel to the local memory of each GPU of a set of GPUs. Then, DDBS 100 can run a divide and conquer algorithm to run a computation on each of the GPUs to analyze the data each GPU has in its local memory. The divide and conquer algorithm can be run in multiple phases. A set of results can be generated. These steps can be repeated.

The parallel loading of data to GPUs, can be followed by processing, generating some results, and then repeating. DDBS 100 can be modified to include GPUs. This can include using more user-defined functions, and parallel data processing. However, DDBS 100 can use Spark. Spark can have a process for working in the GPUs as Spark operates in memory. Spark can use the previous pattern provided supra. DDBS 100 can run a Spark instance on each of the GPUs. (e.g. on local memory of GPU). DDBS 100 can extend this, but instead of storing all the data in memory and having the GPU process it, DDBS 100 can store digests of a larger piece of data in memory (e.g. a key, etc.). DDBS 100 can implement a one-way hash RIPEMD 160 to produce a digest (e.g. a 20-byte digest). The digest is stored for all the relevant data components for the processing.

The DDBS 100 can be scanned. The digest can be used to populate each GPU's local memory. DDBS 100 can do parallel scans as well. For example, there can be 100 GPUs and approximately 4000 partitions. DDBS 100 can implement a 100-way parallel population program that scans each of the partitions and then scans the digests stored in memory in DRAM in DDBS 100. In one example, DDBS 100 can scan for all the partitions but at 100 partitions at a time. DDBS 100 can provide for parallel process(es) for filling up all the digests in memory. The actual data can be much larger on a per record basis (e.g. digest may be 20 bytes) and data can be in kilobytes in terms of size. When run the individual process on the GPU, using the digest, the data from DDBS 100 can be fetched in batches. This can be done in sub-millisecond periods in some examples.

Figure 4:
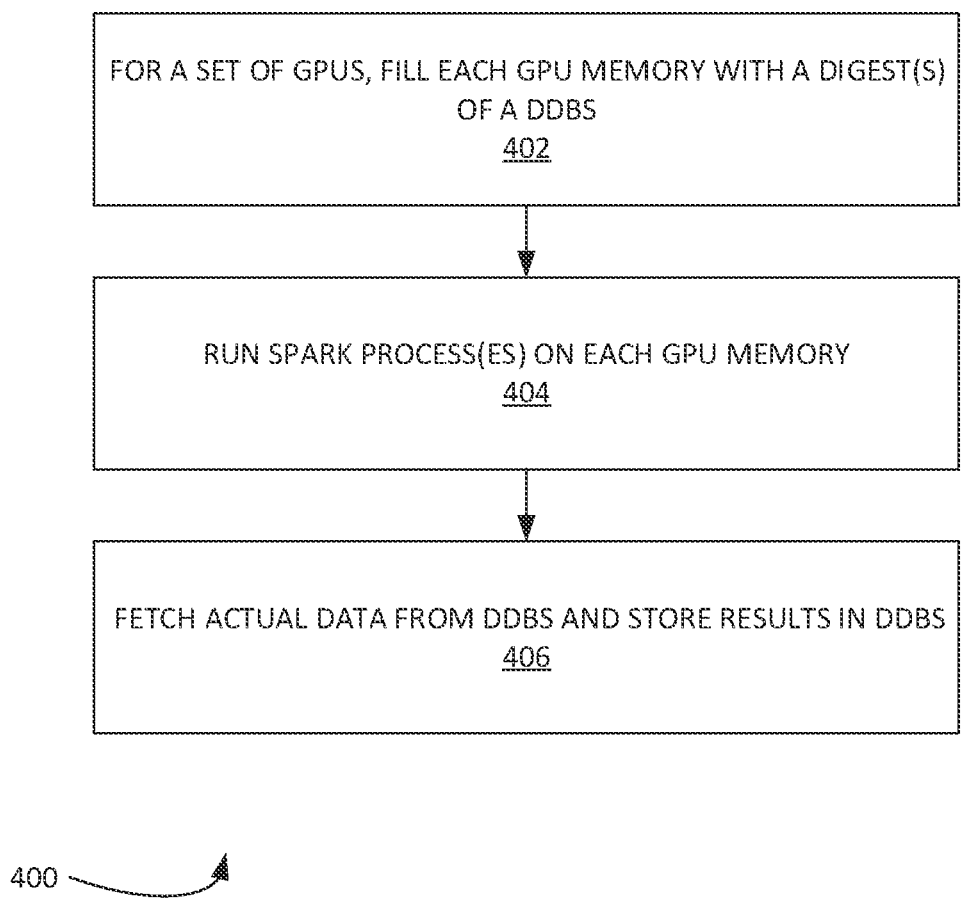
FIG. 4 illustrates an example process for expanding GPU memory footprint based on hybrid-memory, according to some embodiments.

FIG. 4 illustrates an example process 400 for expanding GPU memory footprint based on hybrid-memory, according to some embodiments. Process 400 can be a two-phase algorithm. In step 402, process 400 can fill GPU memory with digests from DDBS 100. In step 404, process 400 can run Spark process(es) on each GPU memory. It is noted that the digests are in local memory, so process 400 can fetch actual data from DDBS 100 and store results in DDBS 100 in step 106. Process 400 can implement other steps as well (e.g. reload other digests, etc.). In this way, process 400 can extend GPU systems to handle more data than what is fitted into the GPU memory systems.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A computerized method for expanding a graphics processing unit (GPU) memory footprint based on a hybrid-memory of a distributed database system (DDBS) comprising:

providing the DDBS, wherein the DDBS is modified to include a plurality of GPUs, wherein the DDBS comprises a No-SQL DDBS, and wherein DDBS uses a hybrid memory architecture that provides an ability to have real-time access to data by leveraging one or more flash memory systems, and wherein the DDBS implements a one-way hash RIPEMD to produce a digest that is stored as a set of relevant data components for processing by the DDBS;

providing a local memory of a GPU of the plurality of GPUs;

filling the local memory of the GPU with one or more digests from the DDBS;

running a distributed general-purpose cluster-computing framework instance on the local memory of the GPU;

fetching data from the local memory of the GPU using the distributed general-purpose cluster-computing framework instance;

storing a result of the fetch operation in the DDBS to extend the local memory of the GPU to handle more data than what is fitted into the local memory of the GPU;

using a two-faced process that distributes the data in parallel to the local memory of each GPU of the plurality of GPUS;

scanning the DDBS and obtain the digest; and using the digest obtained from the DDBS to populate each local memory of each GPU of the plurality of the GPUs, and wherein the DDBS performs a plurality of parallel scans, and wherein each individual process on the GPU, using the digest fetch the data from DDBS in batches in a sub-millisecond period.

2. The computerized method of claim 1, wherein a plurality of GPUs are provided.

3. The computerized method of claim 2, wherein a distributed general-purpose cluster-computing framework process is run on each of the plurality of GPUs.

4. The computerized method of claim 3, wherein the distributed general-purpose cluster-computing framework comprises an open-source distributed general-purpose cluster-computing framework.

5. The computerized method of claim 4, wherein the open-source distributed general-purpose cluster-computing framework comprises an APACHE SPARK distributed general-purpose cluster-computing framework.

6. The computerized method of claim 5, wherein the DDBS comprises a hybrid memory architecture that is extended to the plurality of GPUs.

7. The computerized method of claim 6 further comprising:

with the DDBS, running a divide and conquer algorithm to run a computation on each of GPU of the plurality of GPUs to analyze the data that each GPU has in its respective local memory.

8. The computerized method of claim 7, wherein the DDBS runs a Spark instance on each local memory of each GPU of the plurality of GPS.

9. The computerized method of claim 8, wherein the DDBS store digests a larger piece of data in a DDBS node memory.

10. The computerized method of claim 9, wherein when running an individual process on a specified GPU of the plurality of GPUs, using the digest, the data from the DDBS is fetched in batches.

* * * * *